(12) United States Patent
Watson et al.

(10) Patent No.: US 12,201,170 B2
(45) Date of Patent: *Jan. 21, 2025

(54) TURN DIRECTION INDICATOR GARMENT

(71) Applicants: Melodie Watson, Brooklyn, NY (US); Astor Morrison, Brooklyn, NY (US)

(72) Inventors: Melodie Watson, Brooklyn, NY (US); Astor Morrison, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,844

(22) Filed: Nov. 9, 2023

(65) Prior Publication Data

US 2024/0065349 A1 Feb. 29, 2024

Related U.S. Application Data

(63) Continuation-in-part of application No. 17/135,302, filed on Dec. 28, 2020, now Pat. No. 11,903,429.

(Continued)

(51) Int. Cl.
| | | |
|---|---|---|
| A41D 13/01 | (2006.01) | |
| A41D 1/02 | (2006.01) | |
| B60Q 1/26 | (2006.01) | |
| B62J 6/057 | (2020.01) | |
| F21S 9/03 | (2006.01) | |
| F21S 43/14 | (2018.01) | |
| F21S 43/15 | (2018.01) | |
| F21W 103/10 | (2018.01) | |
| F21W 103/20 | (2018.01) | |
| F21Y 103/10 | (2016.01) | |
| F21Y 105/14 | (2016.01) | |
| F21Y 113/00 | (2016.01) | |

(Continued)

(52) U.S. Cl.
CPC .............. *A41D 13/01* (2013.01); *A41D 1/02* (2013.01); *B60Q 1/2673* (2013.01); *B62J 6/057* (2020.02); *F21S 9/03* (2013.01); *F21S 43/14* (2018.01); *F21S 43/15* (2018.01); *H05B 45/10* (2020.01); *H05B 45/20* (2020.01); *F21W 2103/10* (2018.01); *F21W 2103/20* (2018.01); *F21Y 2103/10* (2016.08); *F21Y 2105/14* (2016.08); *F21Y 2113/00* (2013.01); *F21Y 2115/10* (2016.08)

(58) Field of Classification Search
CPC ... A41D 13/01; A41D 1/02; F21S 9/03; F21S 43/14; F21S 43/15; H05B 45/10; H05B 45/20; B62J 6/057; B60Q 1/2673
See application file for complete search history.

(56) References Cited

U.S. PATENT DOCUMENTS

| | | | | |
|---|---|---|---|---|
| 2002/0044052 A1* | 4/2002 | Stewart | ..................... | B62J 6/056 340/475 |
| 2010/0251453 A1* | 10/2010 | Chen | ..................... | G08B 5/004 340/815.45 |

(Continued)

*Primary Examiner* — Thomas M Sember
(74) *Attorney, Agent, or Firm* — Brennan, Manna & Diamond, LLC

(57) ABSTRACT

This present application discloses a turn direction indicating jacket having a plurality of directional indicators independently actuatable via a switch and a portable power supply. The invention illuminates the lights in sequential fashion from the wearer's shoulder to his or her wrist with an arrowhead at the base, there ensuring that other motorists and pedestrians alike are aware of the wearer's presence in traffic and the wearer's intended traffic movement.

11 Claims, 4 Drawing Sheets

Related U.S. Application Data

(60) Provisional application No. 63/008,901, filed on Apr. 13, 2020.

(51) Int. Cl.
*F21Y 115/10* (2016.01)
*H05B 45/10* (2020.01)
*H05B 45/20* (2020.01)

(56) References Cited

U.S. PATENT DOCUMENTS

| | | | |
|---|---|---|---|
| 2010/0253501 A1* | 10/2010 | Gibson | A41D 13/01 340/475 |
| 2012/0063124 A1* | 3/2012 | Schrimmer | F21V 21/0808 362/103 |
| 2016/0068214 A1* | 3/2016 | Tang | B62J 6/056 362/108 |
| 2016/0144775 A1* | 5/2016 | Ejiawoko | A41D 13/01 340/465 |
| 2019/0328286 A1* | 10/2019 | Beneyto-Ferre | G08B 5/36 |
| 2020/0027329 A1* | 1/2020 | Lynch | G08B 21/12 |
| 2021/0068477 A1* | 3/2021 | Johnson | A41D 1/002 |

* cited by examiner

TURN DIRECTION INDICATOR GARMENT

CROSS-REFERENCE TO RELATED APPLICATION

The present application is a continuation application of, and claims priority to and the benefit of U.S. patent application Ser. No. 17/135,302, which was filed on Dec. 28, 2020 and claims priority from U.S. Provisional Application No. 63/008,901, which was filed on Apr. 13, 2020, both of which are incorporated herein by reference in their entirety.

BACKGROUND

The present invention relates generally to illuminated safety apparel. More specifically, the present invention relates to a modified garment or a jacket to be worn by, for example, a motorcycle driver, and featuring integrated LED lights on its arms, front, back, shoulder and other surface areas to indicate to other motorists, cyclists and pedestrians the wearer's intended turning direction. Accordingly, the present specification makes specific reference thereto. Nonetheless, it is to be appreciated that aspects of the present invention are also equally amenable to other similar applications.

By way of background, motorcycles, bikes, bicycles, roller blades, skate boards, scooters, snow boards, skis, water skis, etc. are popular outdoor activities that are enjoyed by millions of people each day. Many of the same people also use these types of non-enclosed vehicles for transportation, sports, and various exercise purposes in both normal and adverse weather conditions, such as rain, snow, sleet, etc. However, most of these non-enclosed vehicles are not equipped with a proper signal lighting system to indicate to others the riders' approach, or intended course of action (e.g., the direction of turning, slowing, stopping or moving).

Additionally, users riding traditional motorcycles, bicycles and the like may not be clearly visible to other drivers and pedestrians, particularly at night or in low light conditions. Further, the majority of bicycles and other non-motorized vehicles are not equipped with any signaling lights, and most riders tend to use hand signals to alert and forewarn other vehicles and pedestrians of the rider's intended course of action. Still other riders have a tendency of making sudden vehicular movements without any warning, which may result in an accident, serious injury or even death. Moreover, while some advanced bicycles are equipped with a forward directed light, a reflector on the rear mudguard, of a tail light adjacent to the rear of the seat, the same are not always visible to other drivers or pedestrians, nor are they capable of signaling an intended movement by the user.

Also, visibility of motorcycles on roadways has always been a major concern, and has contributed to a number of serious accidents and fatalities. One such problem is the limited visibility of a motorcycle's turn signal being activated to indicate a left turn or a right turn to be made by the motorcycle operator. This limited visibility can lead to accidents between motorcyclists and other vehicles or pedestrians on the roadways. Because of this poor visibility, motorcyclists tend to suffer a disproportionate number of accidents, injuries and fatalities in the operation of their motorcycles, as opposed to drivers of other types of vehicles. Additionally, motorcyclists or bike riders are particularly vulnerable in traffic. There are a variety of reasons for this, including the fact that motorcyclists are much more exposed than drivers in, for example, a truck or an automobile, and are therefore more prone to be injured in the event of an accident rather than motorists or operators of a truck or automobile.

Presently, some helmets are available that are comprised of a head light or a brake light. However, these types of helmets tend to be relatively heavy and expensive, and are inconvenient for the vehicle operator to wear for long periods of time. Although a multi-lighted helmet is more easily seen by other motorists and pedestrians, the multi-light and multi-feature helmet presents a confusing display and makes it difficult for pedestrians and other motorists to decode the indication of the vehicle operator through the helmet. Further, such helmets do not indicate when the vehicle operator is making a turn and, if so, in which direction, thereby failing to solve the existing issues of turn indication for pedestrians and other vehicle operators.

Therefore, there exists a long felt need in the art for a quick and easy method of indicating a turn or direction change intended to be made by motorcyclists, cyclists, joggers and the like to pedestrians and other vehicle operators. There is also a long felt need in the art for a turn indication system that can be worn by bikers, joggers, bicycle riders, and the like, to increase the individual's visibility to third parties, such as oncoming motorists and pedestrians. Additionally, there is a long felt need in the art for a turn indication or directional indicator solution which can be easily understood by pedestrians and other motor vehicle operators, without requiring prior knowledge of specific rules or having complex operational requirements. Moreover, there is also a long felt need in the art for a cost effective and relatively lightweight garment that indicates an intended turn of a bike, bicycle, motorcycle, etc. on the road, and for a turn or directional indication system that, when illuminated, has greater visibility and is not dependent on the posture or positioning of the wearer to be seen. Finally, there is a long felt need in the art for a safe turn indication system, which brings to focus the wearer, is relatively inexpensive to manufacture and safe and easy to use.

The subject matter disclosed and claimed herein, in one embodiment thereof, is a modified garment or jacket featuring a plurality of integrated light emitting diode (LED) lights on the arms, front, back and shoulder areas of the garment to ensure that other motorists and pedestrians are aware of the wearer's presence and intended turning movement, thereby preventing any accidents, injuries and fatalities. The modified jacket of the present invention allows for independent activation of the signals via a button or other actuation mechanism that may be located on either or each of the sleeves, near the wearer's hand. The invention also illuminates the lights in sequential fashion from the wearer's shoulder to his or her wrist with an arrowhead at the base, thereby insuring that other motorists and pedestrians are aware of the operator's intended and anticipated turning movement. The present invention utilizes waterproof and durable materials such as nylon, polyester and the like to keep the wearer warm, while improving comfort when riding a bike, motorcycle, and the like. Further, the jacket may also comprise a plurality of vertical lights running down the front and/or back of the jacket which function as running or permanent travel lights, and that can be turned on or off by the wearer as needed and to preserve battery life. To that end, the jacket of the present invention also features a single use or rechargeable battery pack, preferably located within the back portion of the jacket, and USB based recharging capabilities.

In this manner, the unique illuminated jacket of the present invention accomplishes all of the forgoing objectives, and provides a relatively quick and easy solution for enhancing the visibility of the wearer. The LED indication system also clearly informs other motorists and pedestrians of the wearer's intended turning movements, thereby preventing any inadvertent accidents, injuries and/or fatalities. Further, the LED indication system of the present invention can be easily understood by pedestrians and other vehicle operators alike, and there is no need for a specialized knowledge of what the LED indications mean or the message that they convey. The modified jacket of the present invention is relatively lightweight, easy and comfortable to wear for a vehicle operator, and can be effortlessly used for prolonged periods of time. The illuminated jacket is also cost-effective, portable and can be used by bike/motorcycle riders, bicycle riders, joggers, skateboarders, pedestrians and others where it would be helpful to have increased visibility, particularly at night and during periods of low visibility, as well as some level of turning movement indication.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a modified garment or jacket featuring a plurality of integrated and coordinated LED lights along the arms, front, back, shoulders and other areas of the jacket to ensure that other motorists and pedestrians are aware of the wearer's presence and intended traffic movements, thereby preventing or at least reducing the likelihood of the wearer becoming involved in an accident or experiencing an injury or fatality. The modified jacket of the present invention allows for independent activation of the signals via a button or other actuation mechanism located on one or both of the sleeves, near the wearer's hand. There may also be other controllers disposed elsewhere along the jacket, which are also easily accessible by the wearer. The plurality of LED lights are capable of illuminating in sequential fashion (e.g., along the arm from the shoulder area to the wrist with an arrowhead at the base), thereby ensuring that other motorists and pedestrians are aware of the wearer's presence and intended traffic movements.

The modified jacket of the present invention may be comprised of waterproof nylon and/or polyester materials to keep the wearer warm while riding a bike, motorcycle, and the like, for example, in inclement weather (e.g., wind, rain, sleet, snow, etc.). The modified jacket may also be comprised of a stylish leather or faux leather to enhance the aesthetics of the jacket and to appeal to the wearer's fashion sense. Further, a number of LED lights may also be positioned in vertical fashion on the front and/or back of the jacket as running or permanent travel lights, wherein the same may be turned on or off as per the wearer's wish and/or to conserve battery life when not needed (e.g., in the daylight). The invention also features a battery pack within the back of the jacket that has USB based recharging capability to power the modified jacket. The USB port could also be used to power other devices of the wearer, such as a smart phone, smart watch, tablet or the like. Further, it is also contemplated that other powering means could also be utilized, such as solar panels, hardwiring the jacket to the motorcycles battery or power supply, etc.

In one exemplary embodiment, an illuminated garment is provided and includes LED lights integrated into various areas of the jacket, including the front, back, shoulders and sleeves of the garment. The LED lights positioned on the sleeves are in an arrowhead shape running sequentially from shoulder to wrist up to a base of the sleeves, and may be activated independently via a button located on each of the sleeves, near the hand. The arrowhead shaped area of the left sleeve integrated with LED lights may be illuminated indicate a left turn, and the arrowhead shaped area of the right sleeve integrated with LED lights may be illuminated to indicate a right hand turn to other vehicle operators and pedestrians. The illuminated garment may further comprise two vertical lights running down the front of the garment and two vertical lights running down the back of the garment, which are intended to be permanent running lights and can be turned on or off by the wearer using a button disposed on an inner section of the garment. The left and right vertical lights on each of the front and back of the garment may also be activated when the corresponding LED lights on one of the left or right sleeves is activated, thereby further serving to indicate the intended traffic movement of the wearer.

In a yet still a further exemplary embodiment of the presently described invention, an illuminated garment is provided for indicating a turn or direction to pedestrians and other vehicle operators. The garment has left turning indicative lights integrated on a left sleeve of the garment; right turning indicative lights integrated on a right sleeve of the garment; a first switch/button placed on a base of the left sleeve near the wearer's left hand; and a second switch/button placed on a base of the right sleeve near the wearer's right hand. The actuation of the first switch enables the left turning lights on the left sleeve to turn ON. Actuation of the second switch enables the right turning lights on the right sleeve to turn ON. The garment may further comprise two vertical travel or running lights on each of the front and back areas of the garment, and an actuator for actuating the same that may be positioned on an inner portion of the front of the garment near the zipper, which, when actuated, turns ON the travel or running lights to better illuminate the wearer during the nighttime or in other low light environments.

In a further exemplary embodiment of the presently described invention, a wearable directional indicating system is provided and includes a garment having at least a back panel, a front panel and right and left sleeves and fits on a torso of an individual. The system further includes a vehicle for operation by the individual, wherein the vehicle is suitable for supplemental indicator lights, and a plurality of lighting strips, wherein each of the lighting strips is independently actuatable by a switch/controller or by the vehicle itself via a wireless connection such as Bluetooth or RFID technology. One of the plurality of lighting strips is mounted on each of the right and left sleeves of the garment, thereby forming a directional indicator for each of the left and right traffic movements.

In yet another exemplary embodiment of the presently described invention, a method of using a turn indicator garment is described and includes the initial step of providing a garment having a torso portion with front and back panels and left and right sleeves, wherein each sleeve portion further comprises a wrist portion containing a switch. Further, each of the front and back panels comprise a directional lighting strip, and at least one of the front and back panels have a running light. In a next step, a lighting setting is selected by the wearer, and then actuation of a directional lighting strip by operation of the switch on one of the wrist portions of the sleeve. More specifically, the directional lighting strip is illuminated and conveys the directional intent of the wearer to other motorists and pedestrians. Finally, the movement is completed in a direction of the operated directional lighting strip by the wearer, and the illumination of the directional lighting strip is then terminated by the wearer by depressing the switch on the selected one of the wrist portions.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
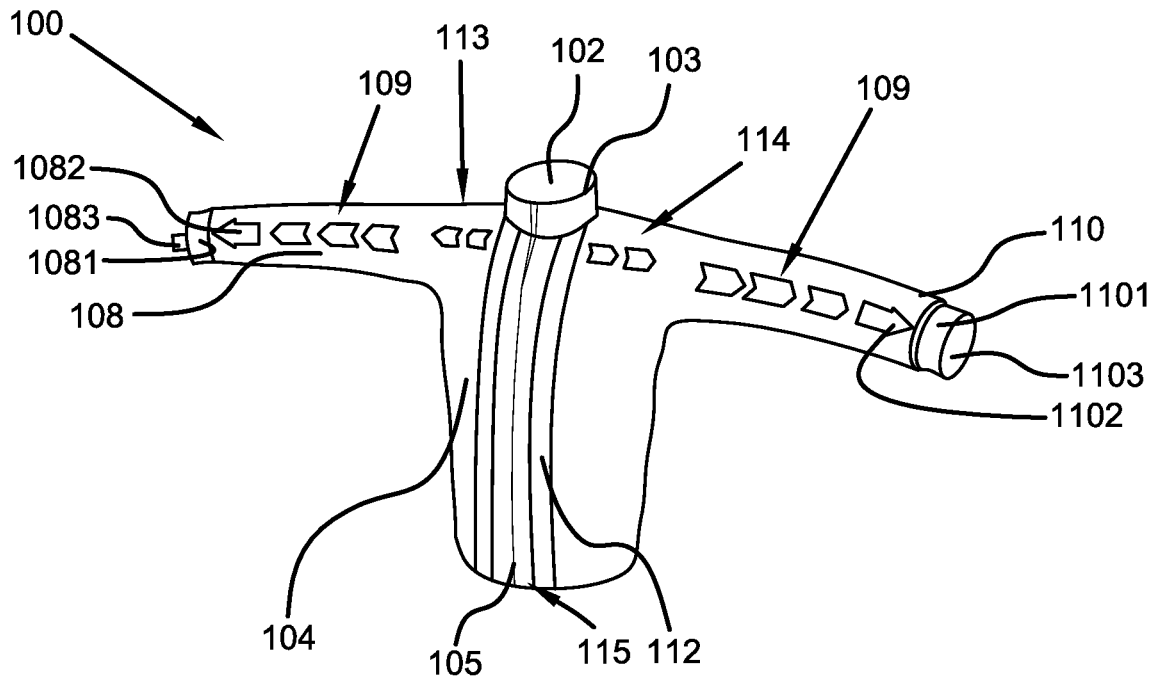
FIG. 1 illustrates a front perspective view of one potential embodiment of the turn signal indicator jacket of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there is a long felt need in the art for a quick and easy method of indicating a turn or direction change intended to be made by a motorcyclist, a cyclist, a jogger or the like to pedestrians and other vehicle operators. There is also a long felt need in the art for a turn indication system that can be worn by bikers, joggers, bicycle riders and the like to increase the wearer's visibility to third parties, such as oncoming motorists and pedestrians, particularly at night and in other low light conditions. Additionally, there is a long felt need in the art for a directional indicator solution that is easily understood by others and that does not require specific prior knowledge or have complex operational requirements. Moreover, there is also a long felt need in the art for a cost effective and relatively lightweight garment that is stylish, provides warmth to the wearer and that is not dependent on the posture or positioning of the wearer to be seen. Finally, there is a long felt need in the art for a safe turn indication system that draws attention to the wearer, is relatively inexpensive to manufacture, and is safe and easy to use.

The innovative product of the present invention features a modified garment, apparel item or jacket having integrated lighting, such as LED lights, on selected portions of the body, sleeves, front, back and shoulder areas to ensure that other motorists and pedestrians are aware of the wearer's presence and intended traffic movements, thereby preventing or reducing the likelihood that the wearer will be involved in an accident, injured or killed. In one embodiment, the modified jacket of the present invention allows for independent activation of the LED lights and signals via a button located on one or both of the sleeves, near the wearer's hand. The garment is also capable of illuminating the LED lights and signals in sequential fashion from, for example, the shoulder area to the wrist, with an arrowhead positioned at the base, thereby ensuring that other motorists and pedestrians are aware of the operator's presence and intended traffic movement. The jacket or other garment may be comprised of waterproof nylon and/or polyester materials to keep the rider warm while improving comfort when riding or operating a bike, motorcycle, and the like. Further, vertical lights positioned along the front and/or back portions of the garment are intended to function as running travel lights, and can be turned on or off as per the wearer's preference. The garment of the present invention also features a battery pack with USB based or other charging capabilities to power the LED lights. Further, the modified jacket or garment of the present invention may be available in various sizes and colors to accommodate all user needs and preferences. Exact size, measurement, construction, and design specifications may vary upon further development and manufacturing. In addition to jackets, the invention of the present invention could be utilized with shirts, sweaters, vests, wraps, and the like.

Referring initially to the drawings, FIG. 1 illustrates a front perspective view of one potential embodiment of the turn signal indicator jacket 100 of the present invention in accordance with the disclosed structure. The jacket 100 may be of conventional construction having a front 104, a back 106, right and left arms or sleeves 108, 110, right and left shoulder portions 113, 114, a neck opening 102, a collar 103 and a front closure mechanism 105, which is typically a zipper but could be any other commonly known closure mechanism. The jacket 100 is further comprised of a plurality of lights, such as LED lights 1082, 1102, 112, a control circuit 118 for controlling the operation of the plurality of LED lights 1082, 1102, 112, and a portable power source 200 for powering the various LED lights.

More specifically, a plurality of LED or other lighting strips 1082, 1102 are positioned in an arrowhead shaped configuration 109 along the right and left sleeves 108, 110 to both provide increased visibility to the front and sides of the wearer, and to signal to others the wearer's intended traffic movement. In a preferred embodiment, the lighting 1082, 1102 should be positioned on the jacket sleeves 108, 110 in a position for optimum viewing when the wearer is operating the motorcycle, and his or her arms are extended to the handlebars. A front view of garment 100 clearly illustrates a continuous sequential series of LED lights 1082 extending down from the right shoulder 113 of the wearer, along the right arm 108, and to the right arm base 1081, thus defining the lighting strips 1082 for the right arm sleeve 108, and a continuous sequential series of lights 1102 extending down from the left shoulder 114 of the wearer, along the left arm 110, and to the left arm base 1101, thus defining the lighting or LED strips 1102 for the left arm sleeve 110. Additionally, a right turn LED button or switch 1083 and a left turn LED button or switch 1103 are located on the base 1081, 1101 of the right and left arms 108, 110 respectively.

When activated by pressing the individual LED button 1083 for the right arm, only the lighting or LED strips 1082 within the arrow-head shaped portion 109 would be turned ON for the right arm sleeve 108. In a similar manner, when the individual LED button 1103 for the left arm is pressed/switched-on, only the lighting or LED strips 1102 within the arrow-head shaped portion 109 would be turned ON for the left arm sleeve 110. The right and left lighting or LED strips 1082, 1102 may be selectively set or programmed to function in a particular mode including, without limitation, lit continuously, slowly fade from bright to off, from off to bright, blink intermittently, etc. The right and left lighting strips 1082, 1102 may also have an associated light sensor to determine brightness.

Additionally, the front 104 and the back 106 portions of jacket 100 may further comprise vertical strips of lights 112, which are permanent or travel running lights that can be turned ON, for example, before starting the ride or in low light conditions, and can be turned OFF, for example, once the ride is over or in daylight to conserve battery power. More specifically, the lights 112 may be controlled by utilizing a travel light switch 115 affixed to an inner section of the front closure or zipper 105 of the jacket 100. Alternatively, the running lights 112 may also have a light sensor (not shown), which will automatically activate the lights 112 when the ambient light reaches a certain minimum threshold, such as during cloudy days, at night or in other low light environments (e.g., in a tunnel, under an overpass, etc.). The switch 115 may also be a pressure switch actuated by a flexing of the arm, wrist, elbow, or other portion of the wearer's body to actuate the switch, thereby not requiring the wearer to take his hand off of the motorcycle's handlebars.

As mentioned above, the front closure mechanism 105 of jacket 100 is preferably a zipper. However, other front closure mechanisms 105 are also contemplated including, without limitation, hook and loop fasteners, buttons, and the like. Additionally, right and left turn signal indicators 1082, 1102 are preferably comprised of a plurality of LED lights in a generally arrowhead shaped configuration 109. As shown, the arrowhead 109 points either left or right in the direction of the turn to be indicated. By pointing in their respective directions, left and right turn signal indicators 1102 and 1082 clearly and unambiguously convey their intended message of the wearer's intended traffic movement, which will help to reduce accidents and improve safety.

The jacket 100 further preferably includes a battery pack (not shown) placed on the interior of the back 106 of the jacket 100 (or other suitable location), which may be used to power the lighting or LED strips 1082, 1102, as well as the vertical lights 112. Further, the battery pack may have USB capability, and may be comprised of single use or rechargeable batteries that can be charged via the USB port. Nonetheless, it is also contemplated that the jacket's lights could also be powered by one or more solar or photovoltaic panels or cells, or any other power supply system capable of powering the LED lighting system and/or other accessories of the illuminated turn indication jacket 100.

Figure 2:
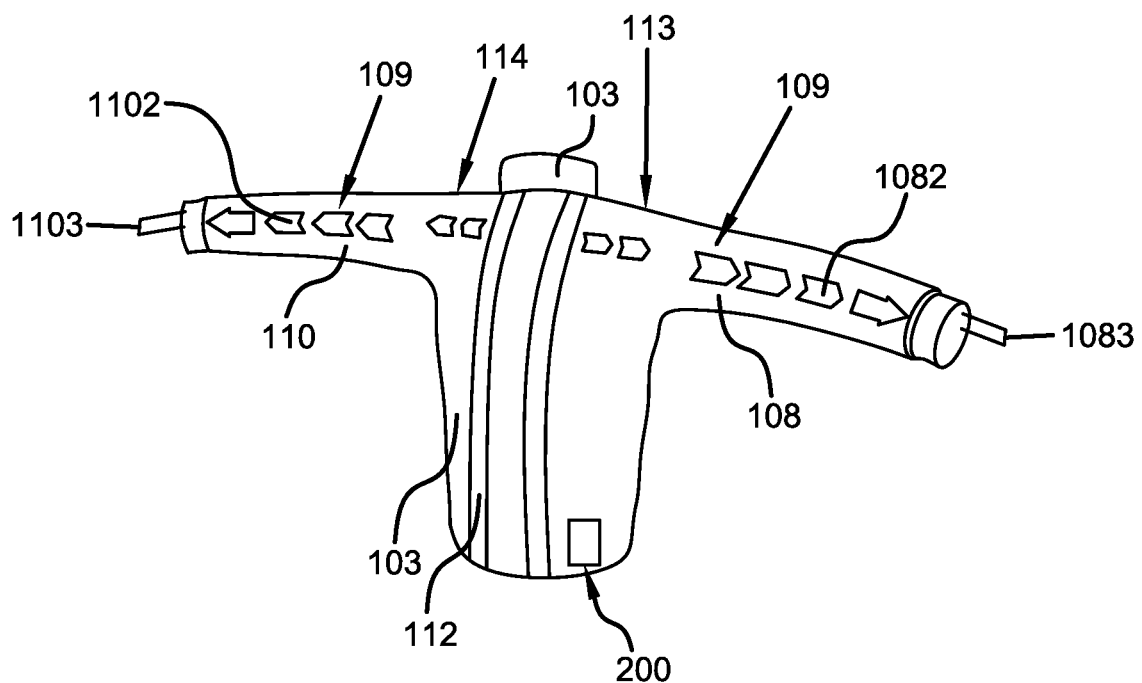
FIG. 2 illustrates a rear perspective view of one potential embodiment of the turn signal indicator jacket of the present invention in accordance with the disclosed structure.

FIG. 2 illustrates a rear perspective view of one potential embodiment of the turn indicator jacket 100 of the present invention in accordance with the disclosed structure. Similar to the front view, the jacket 100 would be of conventional construction having a back 106, arms or sleeves 108, 110, shoulders portions 113, 114 and a collar 103. The jacket 100 further comprises a plurality of LED strips 1082, 1102 positioned within the arrowhead shaped portion 109 on the sleeves 108, 110, the arrowhead shaped portions 109 being strategically placed on the back portion of the right and left sleeves 108, 110 of the jacket 100 to provide maximum visibility to either side of the wearer, and from the rear. More specifically, the rear view of garment 100 illustrates a continuous sequential set of lights such as right turn LED lights 1082 extending down from the right shoulder 113, along the right arm 108, and to the right arm base 1081, and a continuous set of sequential lights including left turn LED lights 1102 that extend down from left shoulder 114, along the left arm 110, and to the left arm base 1101.

Further, a right turn light switch 1083 and a left turn light switch 1103 are located on the respective right and left bases 1081, 1101 of the right and left sleeves 108, 110, respectively. The back 106 further includes vertical running lights 112 that can be turned ON or OFF to suit user need or preference, and increase overall visibility of the wearer. The jacket 100 further comprises a battery pack 200 placed on the back 106 of the jacket 100, which may be used to power the LED strips 1082, 1102, as well as vertical lights 112. The use of LED strips 1083, 1103 and vertical lights 112 on both the front 104 and back 106 of the jacket 100 provides increased visibility of the wearer to pedestrians and other motor vehicle operators regardless of their orientation in relation to the wearer.

Figure 3A:
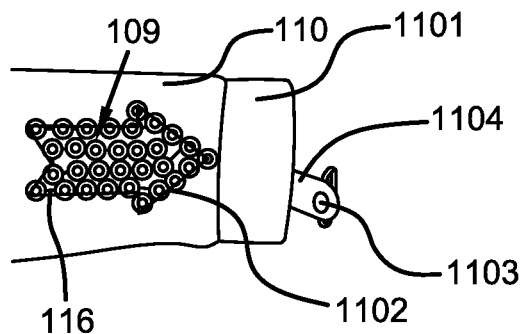
FIG. 3a illustrates a close-up perspective view of one potential embodiment of the left sleeve of the turn signal indicator jacket of the present invention in accordance with the disclosed structure, wherein the plurality of LED lights are in an OFF state.
Figure 3B:
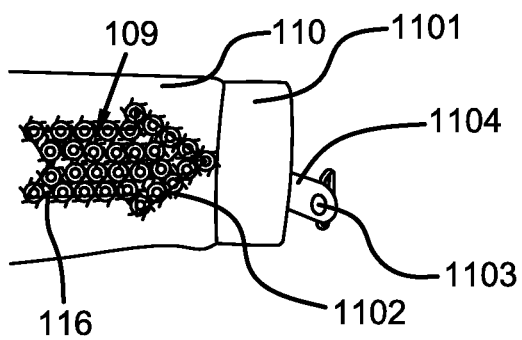
FIG. 3b illustrates a close-up perspective view of one potential embodiment of the left sleeve of the turn signal indicator jacket of the present invention in accordance with the disclosed structure; wherein the plurality of LED lights are in an ON state.

FIG. 3a illustrates a close-up perspective view of one potential embodiment of the left sleeve 110 of the turn signal indicator jacket 100 of the present invention in accordance with the disclosed structure, wherein the plurality of LED lights 1102 are in an OFF state, and FIG. 3b illustrates a close-up perspective view of the left sleeve 110 of the turn signal indicator jacket 100 with the plurality of LED lights 1102 in an ON state. Further, a fiber-optic thread 116 may be used for sewing or attaching the light or LED strips 1102 into or onto the left sleeve 110 of the jacket 100. Nonetheless, it is also contemplated that LED strips 1102 may be attached to the sleeve 110 by any other convenient method or means including, without limitation, adhesives, heat sealing, and the like. In this manner, the LED strips 1102 may be added to the jacket or garment 100 post manufacture by the owner of the garment, or a merchant selling such lighting accessories to the general public. The left sleeve 110 includes a base portion 1101 positioned near the wrist of the wearer portion, wherein a strap 1104 with a left turn switch 1103 is provided. Actuation of the left turn switch 1103 activates the left turn LED strip 1102, thereby indicating a left turn to pedestrians and other motor vehicle operators in the vicinity of the wearer. Further, the light or LED strips 1102 are strategically provided on the front and back portions of the left sleeve 110 and left shoulder area 114 in order to maximize the visibility of the left turn indication. Other switching mechanisms may also be used to turn on the light or LED strips 1102, such as motion switches, toggle or button switches, pressure switches and the like.

As noted above, FIG. 3(*b*) illustrates an illuminated left turn signal 1102 in an arrowhead or directional portion 109 of the left sleeve 110. More specifically, the wearer may press the left turn button or switch 1103 to activate the left turn signal 1102 via fiber optic thread 116 and indicate an intended left turning movement to other motorists. Exact size, measurement, construction, and design specifications may vary upon further development and manufacturing, and the LED lights 1102 and/or fiber optic threads 116 can be provided in many different, commercially-available colors including, without limitation, red, blue, cyan, neon, fluorescent, green, yellow, white, orange, or any combination thereof. Additionally, rather than having a LED light strip, the directional indicator could be provided by fiber optic light bundles, rope lights and the like.

Figure 4A:
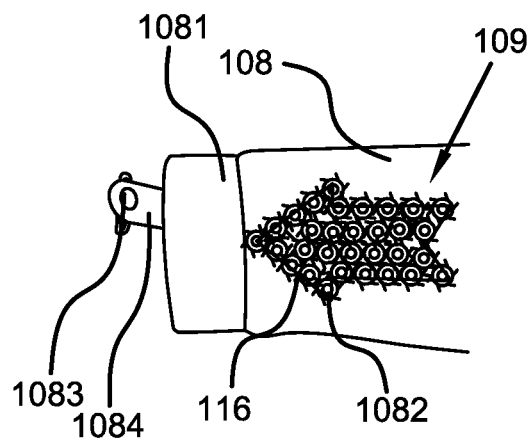
FIG. 4a illustrates a close-up perspective view of one potential embodiment of the right sleeve of the turn signal indicator jacket of the present invention in accordance with the disclosed structure, wherein the plurality of LED lights are in an OFF state.
Figure 4B:
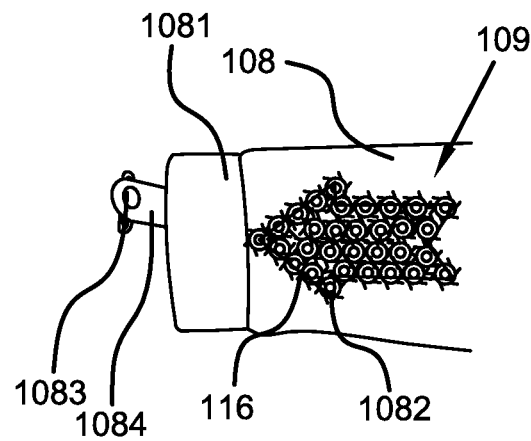
FIG. 4b illustrates a close-up perspective view of one potential embodiment of the right sleeve of the turn signal indicator jacket of the present invention in accordance with the disclosed structure; wherein the plurality of LED lights are in an ON state.

FIG. 4 illustrates a front close-up view of the right sleeve 108 of the turn indicator jacket 100 of the present invention in accordance with the disclosed structure, which is configured and functions substantially the same as the left sleeve 110. More specifically, FIG. 4(*a*) shows a portion of the right sleeve 108 having an arrowhead portion 109 in a right direction and integrating a light or LED strip 1082. A fiber-optic thread 116 may be used for sewing or attaching the LED strips 1082 into or onto the right sleeve 108 of the jacket 100. Further, the LED strips 1082 may be attached to the sleeve 108 by any other convenient method, e.g., adhesives, heat sealing, and the like. The right sleeve 108 includes a base 1081 located near the wrist of the user and to which a strap 1084 with a right turn switch 1083 is provided. Actuation of the right turn switch 1083 activates the right turn LED strip 1082, thereby indicating a right turn to pedestrians and other motor vehicle operators. The LED strips 1082 are strategically provided on both the front and back portions of the right sleeve 108 and right shoulder 113 in order to maximize the visibility of the right turn indication. Rather than having a LED light strip 1082, the directional indicator could be provided by fiber optic light bundles, rope lights and the like.

FIG. 4(*b*) shows an illuminated right turn signal 1082 in an arrowhead portion 109 of the right sleeve 108. A user presses the right turn switch 1083 and activates the right turn signal 1082, thereby indicating a right turn direction to oncoming motorists. More specifically, a fiber-optic thread 116 receives electrical power from a power supply or battery pack 200 and powers the LED light strip 1082. Exact size, measurement, construction, and design specifications may vary upon further development and manufacturing, and the LED lights 1082 and/or fiber optic threads 116 can be provided in many different, commercially-available colors including, without limitation, red, blue, green, yellow, white, orange, or any combination thereof.

Figure 5:
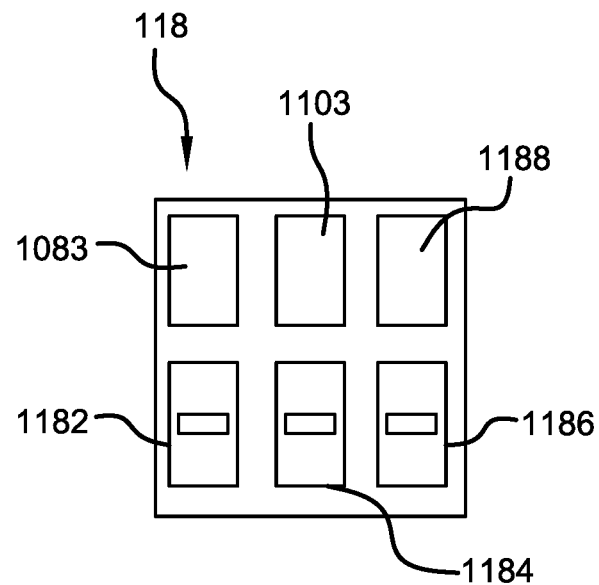
FIG. 5 illustrates a schematic view of one potential embodiment of a control circuit of the turn signal indicator jacket of the present invention in accordance with the disclosed structure.

FIG. 5 illustrates an exploded view of one potential embodiment of a control circuit of the turn indicator jacket 100 of the present invention and in accordance with the disclosed structure. The control circuit 118 may be attached to any inner portion of the jacket 100 to protect the same from the elements (e.g., wind, rain, snow, sleet and the like). The control circuit 118 preferably comprises a brightness controller 1182, a mode controller 1184, a color controller 1186, and a power controller 1188, and is in electrical or wireless communication with switches 1083 and 1103, for example, via Bluetooth. More specifically, the control circuit 118 provides or shuts off power to the LED lights 1082, 1102 and/or fiber optic threads 116 from the power supply 200.

The brightness controller 1182 allows the wearer to control the brightness of the various LED lights 1082, 1102, vertical lights 112, and/or fiber optic threads 116, so that additional illumination is available on demand, and so that less illumination may be specified by the wearer when not needed to conserve, for example, battery power.

Mode controller 1184 allows the wearer to control the mode of operation of the LED lights 1082, 1102, vertical lights 112, and/or fiber optic threads 116. For example, various modes of operation are contemplated including, without limitation, continuous lighting, flash simultaneously in a regular on and off pattern, flash in a fluctuating manner if required, flash simultaneously in a pattern of any number of quick flashes followed by an off state of longer duration before repeating the pattern of quick flashes, flash in any type of regular or irregular pattern to include specific codes, flash in a programmed or random sequence, fading light operation from bright to dark, or any other combination or variation thereof to suit user need and/or preference.

Similarly, color controller 1186 may be used by the wearer to change the color of the LED lights 1082, 1102, vertical lights 112, and/or fiber optical threads 116 for example, by changing the color of all such lights 1082, 1102, 112 and threads 116, or by selectively activating only those LED lights 1082, 1102, 112 and threads 116 of a certain color.

Settings for the brightness controller 1182, the mode controller 1184 and the color controller 1186, can be modified by the manner of actuating the switches 1083, 1103 and 115 multiple times. For example, pressing a switch 1083, 1103 and/or 115 activates the LED lights; pressing any of the switches 1083, 1103 and/or 115 continuously for two times allows a user to change the mode; pressing any of the switches 1083, 1103 and/or 115 for longer periods of time (for example, more than 2 secs) allows the wearer to control the brightness of the LED lights; and pressing any of the switches 1083, 1103 and/or 115 continuously for three times allows a user to change the color of LED lights. Notwithstanding, it is also contemplated that control circuit 118 may be a central controller that is capable of controlling the LED lights 1082, 1102 and 112, and fiber optic threads 116 of turn indication jacket 100 at the same time, via any known wireless technology such as Bluetooth, Wi-Fi, NFC, RFID or the like and a smart device (not shown) such as a mobile phone.

Figure 6:
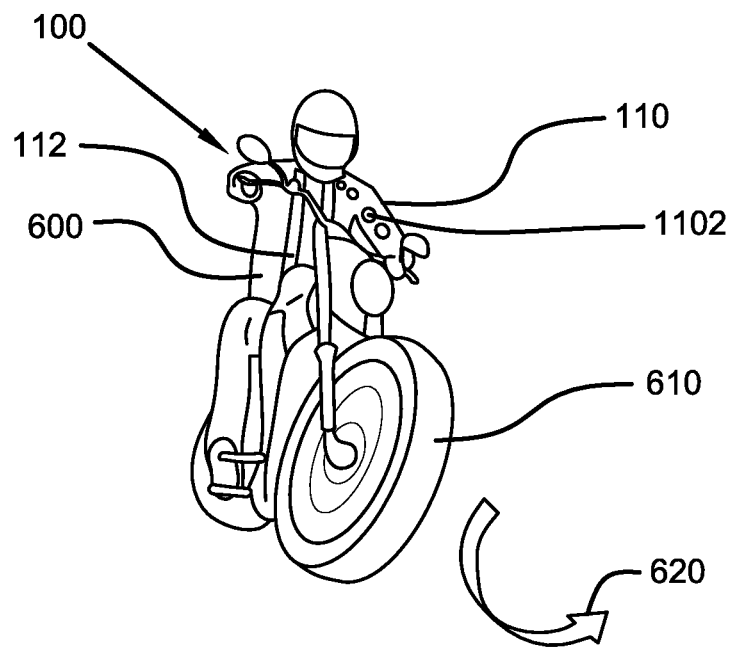
FIG. 6 illustrates a perspective view of a motorcycle rider wearing one potential embodiment of the turn signal indicator jacket of the present invention and signaling a left turning movement in accordance with the disclosed structure.

FIG. 6 illustrates a perspective view of a rider 600 riding a motorcycle 610 wearing one potential embodiment of the turn signal indicator jacket 100 of the present invention and signaling a left turning movement 620 in accordance with the disclosed structure. More specifically, the rider 600 may turn ON the vertical lights 112 on the front 104 and back 106 of the jacket 100 by actuating a travel light switch 115. Once actuated, the vertical travel lights 112 may remain ON for a preselected period of time or until manually turned OFF by the rider 600. Further, before making a left turn 620, the rider 600 may signal the intended traffic movement to other motorists and/or pedestrians by actuating the left turn LED signal 1102 by means of switch 1103 positioned on the left sleeve 110, which then blinks or flashes in the manner described above and is powered by the motorcycle's battery 200.

Figure 7:
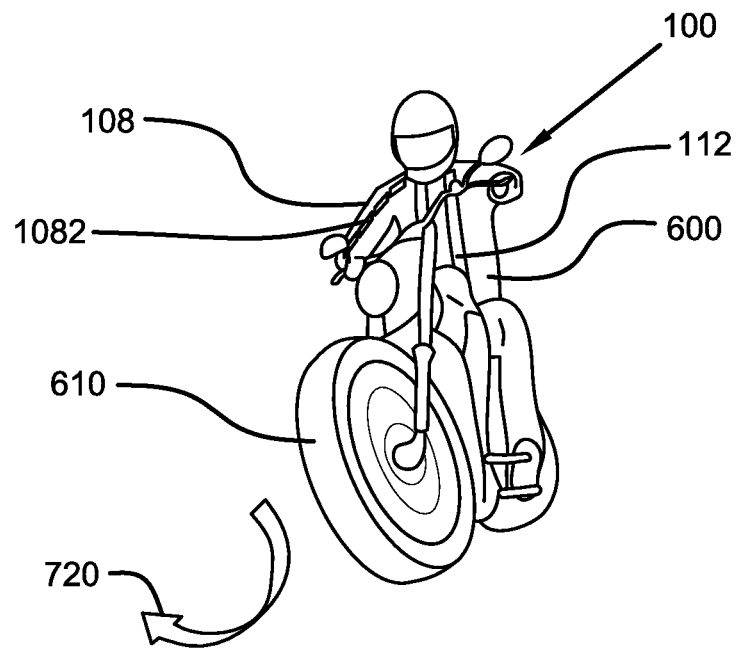
FIG. 7 illustrates a perspective view of a motorcycle rider wearing one potential embodiment of the turn signal indicator jacket of the present invention and signaling a right turning movement in accordance with the disclosed structure.

Similarly, FIG. 7 illustrates a perspective view of a rider 600 riding a motorcycle 610 wearing one potential embodiment of the turn signal indicator jacket 100 of the present invention and signaling a right turning movement 720 in accordance with the disclosed structure. More specifically, the rider 600 may turn ON the vertical lights 112 on the front 104 and back 106 of the jacket 100 by actuating a travel light switch 115. Once actuated, the vertical travel lights 112 may remain ON for a preselected period of time or until manually turned OFF by the rider 600. Further, before making a right turn 720, the rider 600 may signal the intended traffic movement to other motorists and/or pedestrians by actuating the right turn LED signal 1082 by means of switch 1083 positioned on the right sleeve 108, which then blinks or flashes in the manner described above and is powered by the motorcycle's battery 200. It should be understood that actuation of the turn signal actuates the turn signal on the front and back of the jacket or garment 100. That is, for a right turn, both lighting strips or LED strips 1082 on the front and back of the right arm 108 are actuated so that observers in both the front and back of the operator can see the signal being generated.

Figure 8:
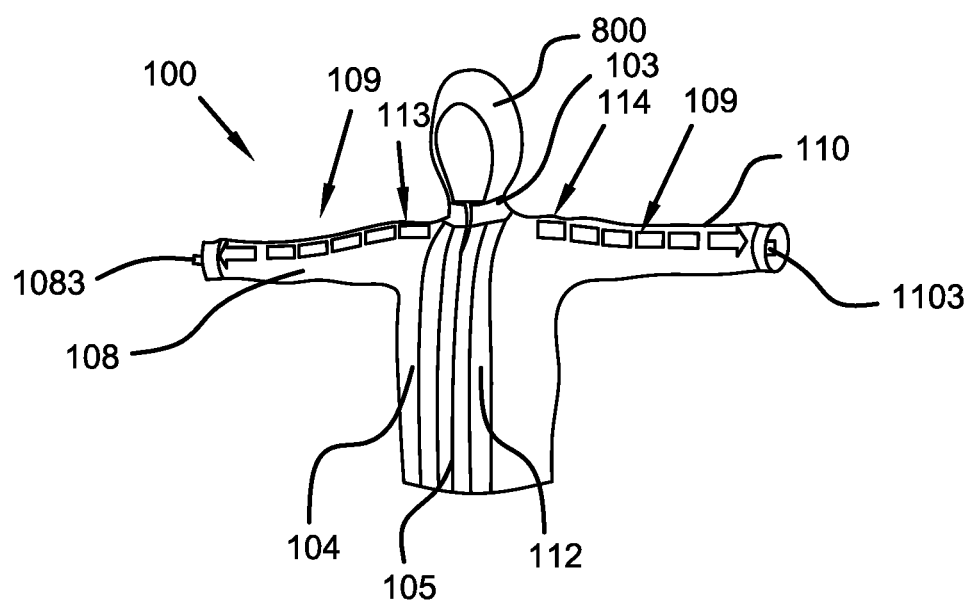
FIG. 8 illustrates a front perspective view of one potential embodiment of the turn signal indicator jacket of the present invention in accordance with the disclosed structure and having a hood.

FIG. 8 illustrates a front perspective view of one potential embodiment of the turn signal indicator jacket 100 of the present invention in accordance with the disclosed structure and having a hood 800. The hood 800 may be integrally formed with the jacket 100, or may be detachable therefrom. More specifically, in one potential embodiment, the jacket 100 includes a detachable hood 800 that is removably attached to the collar 103 to protect portions of the head and neck of the wearer 600. The hood 800 may be removably attached to the collar 103 by any means known in the art including, without limitation, buttons, a zipper, hook and loop fasteners, etc. The hood 800 may also be water-proof to protect the rider 600 from the elements, such as rain, snow, sleet, etc., and may be comprised of waterproof nylon, polyester materials, and the like, similar to the material used to manufacture jacket 100. In a preferred embodiment, the jacket 100 may be further equipped with a viscos-elastic protective shell to reduce the likelihood of a serious injury should the rider 600 be involved in an accident.

As noted above, it is also contemplated that the modified turn indication jacket 100 may be remotely and wirelessly controlled by a single control circuit 118 via, for example, Bluetooth, WiFi or other radio frequency based technologies. Additionally, the power supply may comprise a battery pack 200 comprised of disposable or rechargeable batteries in electrical communication with the one or more LED light strips 1082, 1102, 112, etc. Nonetheless, it is also contemplated that the power supply could be one or more solar or photovoltaic panels or cells (not shown), or any other power supply system capable of powering the LED lighting system and/or other accessories of the illuminated turn indication jacket 100.

In an embodiment of the present invention, the functions and settings of the control circuit 118 can be changed or set by a corresponding smartphone mobile application (not shown) installed in a mobile device of the user. The smartphone may connect to the control circuit 118 of the turn indication jacket 100 through a suitable wireless communication technology such as Bluetooth, radio frequency, Wi-Fi, NFC, Wi-Fi Direct, cellular network or any other technology known in the art.

As noted above, the jacket 100 may be comprised of waterproof nylon, polyester, waterproof webbing or other similar waterproof material, and the various other components of the jacket 100 including, without limitation, the various light assemblies, switch assemblies, power source, etc., may also be waterproofed. Accordingly, the turn indicator jacket 100 of the present invention may be worn in any type of weather condition, and may also be of any color, shape, style or size that satisfied user need and/or preference.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "turn indicator jacket", "jacket", "rider safety jacket", "illuminated jacket", "turn indicator garment" and "rider jacket" are interchangeable and refer to the turn direction indication jacket 100 of the present invention.

Notwithstanding the forgoing, the turn indication jacket 100 of the present invention can be of any suitable size and configuration as is known in the art without affecting the overall concept of the invention, provided that it accomplishes the above stated objectives. One of ordinary skill in the art will appreciate that the size, configuration and material of the turn indication jacket 100 as shown in the FIGS. are for illustrative purposes only, and that many other sizes of the turn indication jacket 100 are well within the scope of the present disclosure. Although the dimensions of the turn indication jacket 100 are important design parameters for user convenience, the turn indication jacket 100 may be of any size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A directional indicating system comprising:
   a garment having at least a back panel, a front panel, a right sleeve and a left sleeve, and a viscos-elastic protective shell and that fits on a torso of an individual, and wherein at least one of the front and back panels has a running light;

a vehicle for operation by the individual, the vehicle suitable for supplemental indicator lights;

a plurality of lighting strips, each of the plurality of lighting strips being independently actuatable by a switch on a wrist portion of each of the left and right sleeves;

a rechargeable battery comprising a universal serial bus charging port;

a controller for operating each of the plurality of lighting strips in at least one of a plurality of settings; and one of the plurality of lighting strips mounted to each of the right and left sleeves of the garment and forming a directional indicator for each of a left turning movement and a right turning movement;

wherein the plurality of lighting strips comprise at least one rope light and at least one fiber optic light electrically connected to the rechargeable battery via a plurality of fiber-optic threads; and wherein each switch is a light sensing switch or a pressure switch configured to select a lighting setting and to control operation of the directional indicator by actuating the switch a plurality of times; and further wherein the controller comprises a brightness controller for adjusting a brightness of the plurality of lighting strips.

2. A directional indicating system as recited in claim 1, wherein the vehicle is selected from a group including motorcycles, bicycles, skateboards, scooters, and roller skates.

3. A directional indicating system as recited in claim 1, wherein each of the plurality of lighting strips has an arrowhead indicator.

4. A directional indicating system as recited in claim 1, wherein the plurality of settings comprises a continuous lighting, a flash simultaneously in a regular pattern, a flash in a fluctuating pattern, a flash in a programmed sequence, a flash in a random sequence, a fading light operation from light to dark, and a fading operation from dark to light.

5. A directional indicating system as recited in claim 1, wherein the system further comprises a color controller for controlling a color of the plurality of lighting strips.

6. A directional indicating system as recited in claim 5, wherein the color controller selectively changes the color of all or a portion of the plurality of lighting strips.

7. A directional indicating system as recited in claim 1, wherein the rechargeable battery further comprises a power controller for operating the plurality of lighting strips.

8. A directional indicating system as recited in claim 1, wherein each of the right and left sleeves has a lighting strip on each of a front side and a back side of the sleeve, and the lighting strip operates to indicate a directional intent of the individual.

9. A safety garment for a vehicle operator comprising:

a garment generally covering a torso and a left and right arm of the vehicle operator, the garment comprising a front panel, a back panel, a right sleeve, a left sleeve, a viscos-elastic protective shell, and a detachable hood, and wherein at least one of the front and back panels has a running light;

a series of independently actuatable lights, wherein a first light in said series operates in a continuous mode, and a second light and a third light both operate in a directional mode upon actuation;

a rechargeable battery comprising a photovoltaic panel;

a controller comprising a mode controller and a brightness controller for adjusting a brightness of the series of independently actuatable lights; and wherein the second and third lights each have a pair of light sets, with one of the pair of light sets being position on a front side of the right or left sleeve and another of the pair of light sets being positioned on a back side of the right or left sleeve, the pair of light sets operating simultaneously to indicate a directional intent of the vehicle operator;

wherein at least one of the first, second, and third lights is a light emitting diode strip and at least one of the first, second, and third lights is a rope light; and wherein the series of independently actuatable lights is activated by a light sensing switch and a pressure switch on a wrist portion of each of the left and right sleeves configured to select a lighting setting and to control operation of the series of independently actuatable lights by actuating the switch a plurality of times; and further wherein the series of independently actuatable lights is electrically connected to the rechargeable battery via a plurality of fiber-optic threads.

10. A safety garment for a vehicle operator as recited in claim 9, wherein each of the second and third lights has a plurality of settings.

11. A safety garment for a vehicle operator as recited in claim 10, wherein the plurality of settings includes a continuous lighting, a flash simultaneously in a regular pattern, a flash in a fluctuating pattern, a flash in a programmed sequence, a flash in a random sequence, a fading light operation from light to dark, a fading operation from dark to light, and a color.

* * * * *